United States Patent
Lin et al.

(10) Patent No.: US 7,181,680 B2
(45) Date of Patent: Feb. 20, 2007

(54) METHOD AND MECHANISM FOR PROCESSING QUERIES FOR XML DOCUMENTS USING AN INDEX

(75) Inventors: Wesley Lin, Mountain View, CA (US); Yasuhiro Matsuda, Redwood City, CA (US); Garrett Kaminaga, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 429 days.

(21) Appl. No.: 10/427,276

(22) Filed: Apr. 30, 2003

(65) Prior Publication Data

US 2004/0221226 A1 Nov. 4, 2004

(51) Int. Cl.
*G06F 17/24* (2006.01)
(52) U.S. Cl. .................................. 715/501.1
(58) Field of Classification Search ............ 715/501.1, 715/530; 707/102
See application file for complete search history.

(56) References Cited

U.S. PATENT DOCUMENTS

| | | | | |
|---|---|---|---|---|
| 6,240,407 B1 * | 5/2001 | Chang et al. | ............... | 707/102 |
| 6,263,332 B1 * | 7/2001 | Nasr et al. | ..................... | 707/5 |
| 6,366,934 B1 * | 4/2002 | Cheng et al. | ............... | 715/513 |
| 6,510,434 B1 * | 1/2003 | Anderson et al. | ............. | 707/3 |
| 6,581,062 B1 * | 6/2003 | Draper et al. | ............... | 707/102 |
| 6,584,459 B1 * | 6/2003 | Chang et al. | .................. | 707/3 |
| 6,654,734 B1 * | 11/2003 | Mani et al. | .................... | 707/2 |
| 6,721,727 B2 * | 4/2004 | Chau et al. | ..................... | 707/3 |
| 6,804,677 B2 * | 10/2004 | Shadmon et al. | ........... | 707/101 |
| 2002/0103829 A1 * | 8/2002 | Manning et al. | ............ | 707/513 |
| 2002/0156811 A1 * | 10/2002 | Krupa | ........................ | 707/513 |
| 2004/0044659 A1 * | 3/2004 | Judd et al. | ..................... | 707/3 |

OTHER PUBLICATIONS

XML Path Language (XPath)—Version 1.0, W3C Recommendation dated Nov. 16, 1999.*
Votsch, Victor et al., "Oracle XML DB: Uniting XML Content and Data," published by Seybold Consulting in Mar. 2002.*
E-mail dated Feb. 18, 2003 from Shelley Higgins to Chris J. Brokaw, subject is "Re: release date of Oracle ML developer's Guide 9.2.0.1," 2 pages.
Oracle Corporation, "Oracle 9i XML Database Developer's Guide—Oracle XML DB," Release 2 (9.2), Part Number A96620-02, http://download-west.oracle.com/docs/cd/B10501_01/appdev.920/a96620/toc.htm, printed Jul. 15, 2003, 717 pages.

* cited by examiner

*Primary Examiner*—Doug Hutton
(74) *Attorney, Agent, or Firm*—Hickman Palermo Truong & Becker LLP; Christopher J. Brokaw

(57) ABSTRACT

A method and apparatus for processing a query is provided. A query for a set of Matching XML documents is received. A client may transmit the query for a set of XML documents to the database server. The database server transmits a request for the set of XML documents to a persistent storage. The persistent storage uses an index, at least in part, to obtain the set of XML documents sought by the query. The index stores a first set of entries comprising information about the location of elements, a second set of entries comprising information about element attributes, and a third set of entries comprising information about element values. In responding to a particular query, additional XML documents that are not indexed by the index may also be checked to determine if they correspond to the set of search criteria.

16 Claims, 7 Drawing Sheets

102 {
<A attr1 = 'aattval'>
    <B battr = 'battrval'> Bval <C cattr = 'cattrval'> Cval </C></B>
    <B battr = 'battrval'> </B>
</A>
} will be represented as:

The elements:

410 {
    <A attr1 = 'aattval'>    412, 414, 416
    <B battr = 'battrval'> Bval <C cattr = 'cattrval'> Cval </C></B>
    <B battr = 'battrval'> </B>
    </A>    418
} will be indexed as:

| Entry Name | Entry Type | Location Information | |
|---|---|---|---|
| A | 7 | (1:1:3:1) | }430 |
| B | 7 | (1:2:1:2) (1:4:0:2) | }432 |
| C | 7 | (1:3:0:3) | }434 |
| {A} {BvalCval} | 10 | (1:1) | }435 |
| {attr1} {aattrval} | 10 | (1:1) | }436 |
| {B} {Bval} | 10 | (1:2) | }438 |
| {battr} {battrval} | 10 | (1:2)(1:4) | }440 |
| {cattr} {cattrval} | 10 | (1:3) | }442 |
| {C} {Cval} | 10 | (1:3) | }444 |

Where:

Token_Type 7 corresponds to (document id: offset: length: depth)
Token_Type 10 corresponds to (document id: parent_offset)

METHOD AND MECHANISM FOR PROCESSING QUERIES FOR XML DOCUMENTS USING AN INDEX

FIELD OF THE INVENTION

The present invention generally relates to the retrieval of electronic documents, and more specifically, relates to processing queries for XML documents using an index.

BACKGROUND OF THE INVENTION

XML is a markup language for documents containing structured information. A document that conforms to the XML standard ("an XML document") contains one or more elements, the boundaries of which are delimited by angle brackets using start-tags and end-tags, or, for empty elements, by an empty-element tag. For example, <background> </background> is an element bounded by a start-tag and an end-tag, and

<standalone/> is an example of a empty-element tag.

Each element has a type, identified by name, and may have a set of attribute specifications. For example, the type of <background class="example"> </background> is 'background.' Each attribute specification has a name and a value. In XML, all attribute values are quoted. Thus, the name of the attribute specification (or simply the attribute) in the above element is 'class,' while the value is 'example.'

Elements may circumscribe or be associated with displayed content. For example, the following 'background' element, <background class="example">Hello World</background> circumscribes the text "Hello World." In addition to or instead of text, other elements may appear between the start-tag and the end-tag of an element. For ease of explanation, any text or elements within the start-tag and end-tag of an element will be said to be circumscribed by that element.

Various approaches may be used to retrieve existing XML documents based on a set of search criteria. XML documents that satisfy a particular set of search criteria are referred to hereafter as "matching XML documents". For example, one may wish to retrieve all matching XML documents that contain a specified set of elements and/or element attributes.

One approach for retrieving Matching XML documents is to perform a brute force search. A brute force search for XML documents is characterized by examining each of the XML documents, one at a time, to determine if the XML document currently being analyzed corresponds to the set of search criteria before analyzing another XML document. If a set of XML documents is stored in a set of one or more database tables, where one XML document resides in each row of the one or more tables, a brute force search of those documents would be performed by examining each row of the one or more tables to determine if the XML document in that row meets the set of search criteria. The brute force search is undesirable because it is slow and inefficient, especially if the table storing the set of XML documents to be searched is large, as a full table scan must be performed.

Another approach for retrieving matching XML documents involves using a node oriented tree index. FIG. 1 is an illustration of a node oriented tree index 100 used in retrieving XML documents according to this approach. Displayed on FIG. 1 is a set of elements 102 and a node oriented tree index 100 that represents elements 102. The set of elements 102 is an example of the elements that may be found within an XML document. Individual nodes of node oriented tree index 100 contain information related to the elements. The top-level node 110 of node oriented tree index 100 corresponds to an element of type A. Nodes 112 and 114, which are child nodes of the top-level node 110, correspond to those elements immediately circumscribed by the previous element, namely, two elements of type B. The first element of type C itself circumscribes an element of type C, which is represented by node 116.

Node oriented tree index 100 may comprise an arbitrarily number of levels. As a result, node oriented tree indexes suffer from being hard to analyze because it is difficult to perform multiple level jumps because the nodes do not contain information about the overall structure of the index, but merely contain references to parent and child nodes. For example, upon analyzing node 110, one cannot determine how many nodes one must traverse in order to locate elements of type C, or the most efficient way to determine where a particular element is represented. For example, one may have to traverse the entire tree to locate the representation of a particular element. As the tree becomes deeper and wider, the inefficiencies of searching the entire tree increase.

An alternate approach for retrieving XML documents that meet a set of search criteria involves using an inverted index. In this context, an inverted index is an index that uses entries that reference individual documents in a set of documents. For example, consider an inverted index that indexes a set of text-based documents. Each entry in the inverted index comprises a word and a list of documents, possibly with locations within the text, where that word occurs.

For example, suppose one wishes to search three documents, named "1", "2", and "3", whose, contents are respectively: "the cat in the hat," "the cat on the mat," and "I put the hat on the mat." If the index is in the format of 'word (text where word is found, position of word within the text)', the index with location information may be represented by:

the (1,1); (1,4); (2,1); (2, 4); (3, 3); (3, 6)

cat (1,2); (2,2)

in (1,3)

hat (1,5); (3,4)

on (2,3); (3,5)

mat(2,5); (3,7)

I (3,1)

put (3,2).

The word "cat" is in document 1 ("the cat in the hat") starting at position 2, and therefore has an entry (1,2). To find, for instance, documents with both "on" and "mat," first look up the words in the index, and then find the intersection of the texts in each list. In this case, documents 2 and 3 have both words. Documents may be retrieved using the inverted index which contain a specified search criteria. In other words, a list of documents containing the search terms may be retrieved using the inverted index.

Even though a measure of how close the words appear to each other may be determined by comparing the positions of words within the document, inverted indexes do not store the relationship between the words and thus, cannot perform complex queries. For example, inverted indexes could not be used to retrieve all documents that contain the word "cat" in the first sentence of the third paragraph. The additional complexity introduced by the XML language within documents is beyond the capabilities of inverted indexes to process such a query.

Based on the foregoing, it is highly desirable to provide a mechanism for processing a query to retrieve XML documents that overcomes the problems and limitations of the prior art.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 is an illustration of an index according to an embodiment of the invention;

DETAILED DESCRIPTION OF THE INVENTION

A method and apparatus for processing a query is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Architecture Overview

Figure 1:
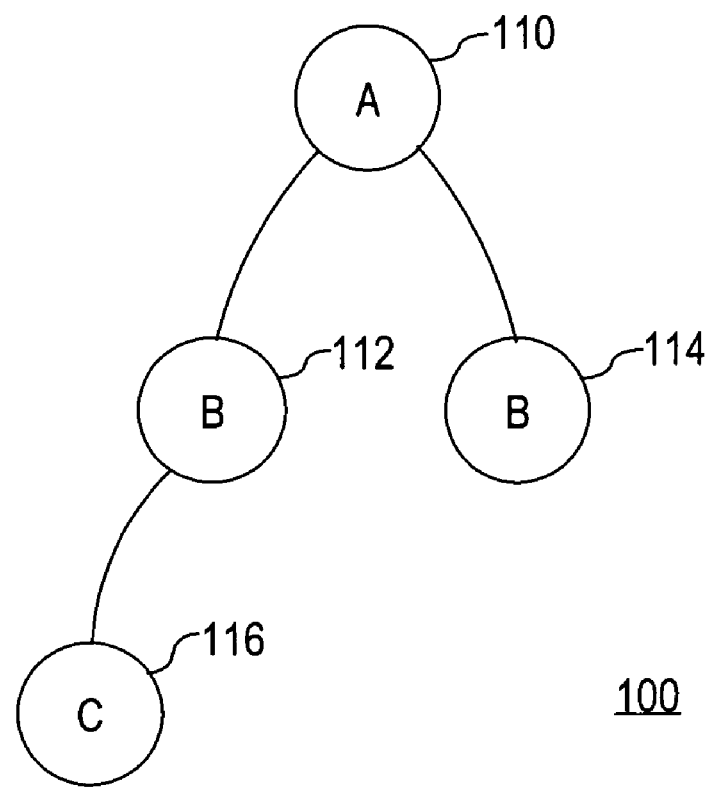
FIG. 1 is an illustration of a node oriented tree index used in retrieving XML documents according to an approach.
Figure 2:
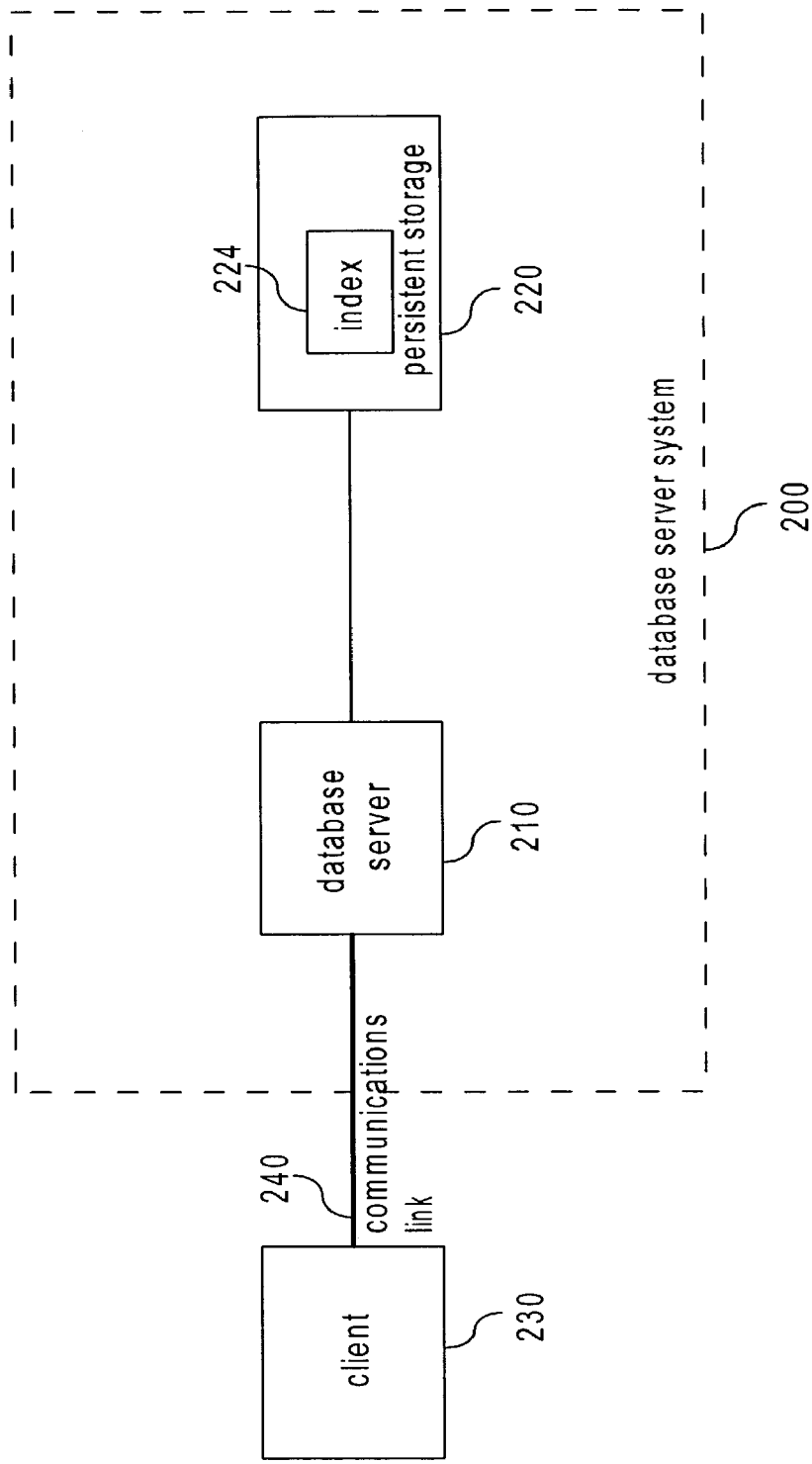
FIG. 2 is a block network diagram illustrating a database server system configured according to an embodiment of the invention.

FIG. 2 is a block network diagram illustrating a database server system 200 configured according to an embodiment of the invention. Database server system 200 may be used to process queries for a set of matching XML documents without incurring the problems of prior approaches. Database server system 200 comprises a database server 210 and persistent storage 220. Database server system 200 may communicate with client 230 over communications link 240.

Database server 210 generally represents any hardware or server component capable of receiving and responding to queries from one or more clients. While only one client 230 is shown in FIG. 2 for ease of explanation, database server 210 may receive and respond to queries from any number of clients. Upon receiving a query for a set of matching XML documents from client 230, database server 210 determines which documents match the search criteria of the query, and retrieves the requested set of XML documents from persistent storage 220. Upon retrieving the requested set of XML documents from persistent storage 220, database server 210 transmits the requested set of XML documents over communications link 240 to client 230.

Persistent storage 220 generally represents any storage medium that is capable of durably storing one or more XML documents. Examples of persistent storage 220 include, without limitation, databases and file servers. Persistent storage may employ an index 224 in retrieving requested sets of XML documents.

Index 224 stores a first set of entries comprising information about the location of elements, a second set of entries comprising information about element attributes, and a third set of entries comprising information about element values. The creation of index 224 is described in further detail in the section entitled "Creating the Index." Processing individual queries with index 224 is described in further detail in the section entitled "Processing Queries using the Index."

Client 230 generally represents any hardware or software component capable of issuing a query to database server system 200. Examples of client 230 include, without limitation, PCs, laptop computers, personal digital assistances, cell phones, web browsers, applications, and operating systems. Client 230 transmits a query for a set of XML documents that correspond to a set of specified search criteria over communications link 240 to database server 210. Client 230 receives a set of XML documents in response to the query over communications link 240 from database server system 210.

Communications link 240 may be implemented by any medium or mechanism that provides for the exchange of data between database server 210 and client 230. Examples of communications link 240 include, without limitation, a network such as a Local Area Network (LAN), Wide Area Network (WAN), Ethernet or the Internet, one or more terrestrial, satellite or wireless links, and serial or parallel printer cables.

Functional Overview

To facilitate the handling of queries for matching XML documents, a special index is created and maintained. According to one embodiment, the index stores (1) entries that contain information about the location of elements, (2) entries that contain information about element attributes, and (3) entries that contain information about element values. As shall be described in greater detail hereafter, use of the index significantly decreases the amount of time required to identify which XML documents satisfy the search criteria specified in queries.

Figure 3:
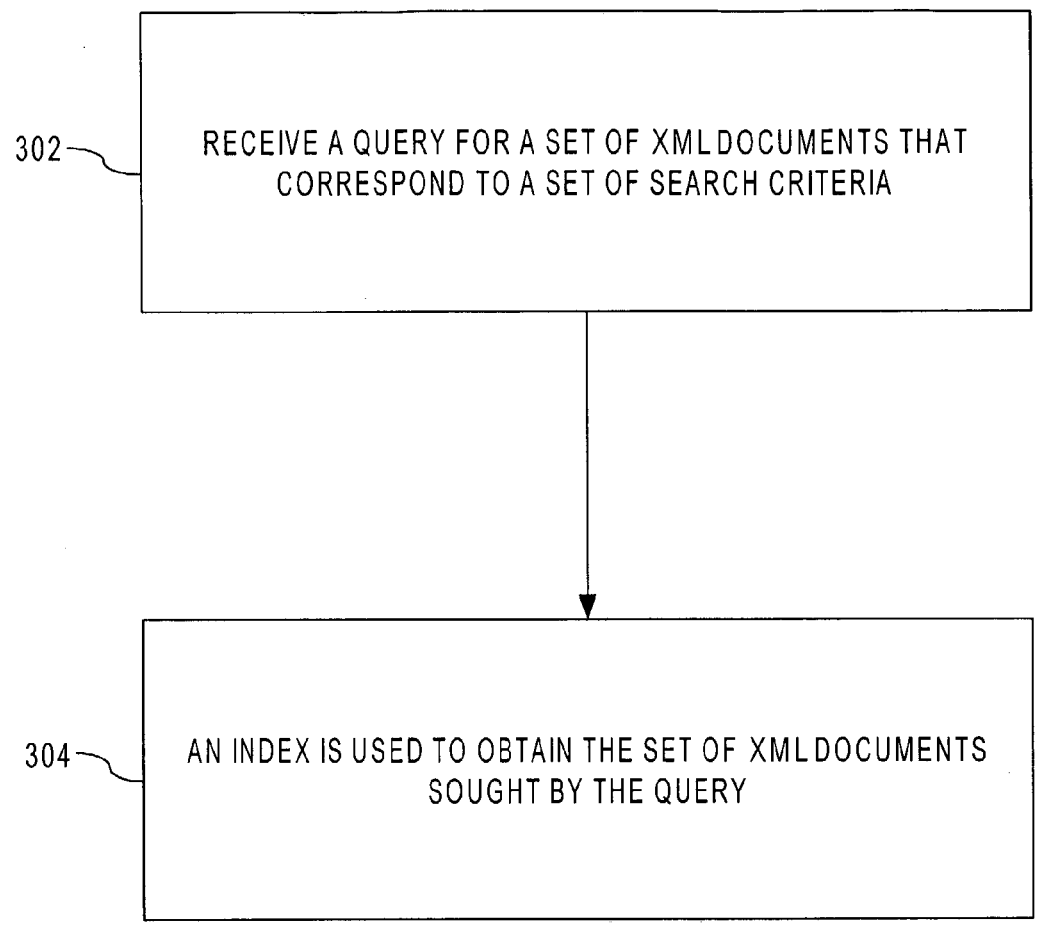
FIG. 3 is a flowchart of the high-level functional steps of processing a query according to an embodiment of the invention.

FIG. 3 is a flowchart of the high-level functional steps of processing a query according to an embodiment of the invention. In step 302, a query for a set of matching XML documents is received. The query may be received, for example, by a database server from a client that wishes to retrieve the matching XML documents from a database that is managed by the database server.

In step 304, the special index is used to identify which XML documents satisfy the criteria specified in the query. In responding to a particular query, additional XML documents that are not indexed by the index may also be checked to determine if those additional documents satisfy the set of search criteria. Once the matching XML documents have been identified, the matching XML documents may be provided to the entity from which the query was received.

The Structure of the Index

As mentioned above, database server 210 uses a special index 224 to speedily identify the XML documents that satisfy search criteria specified in queries. Database server 210 creates index 224 to reflect the set of stored XML documents within persistent storage 220. Periodically, database server 210 may update index 224 to reflect both new XML documents added to persistent storage 220, and XML documents that have been revised since the last time index 224 was created or updated. In an embodiment, database server 210 may be issued a command to update index 224. In another embodiment, database server 210 may be configured to update index 224 after the expiration of a specified time interval or at specified dates and times.

FIG. 4 is an illustration of the structure and content of index 224, according to an embodiment of the invention. For ease of explanation, assume that index 224 is being used to index a single XML document D1. Further assume that XML document D1 includes elements 410, and has been assigned a document identification number of "1."

Index 224 may comprise one or more entries of different types. For example, in an embodiment, index 224 comprises (1) element location entries 420 that contain information about the location of elements, (2) element attribute entries 422 that contain information about element attributes, and (3) element value entries 424 that contain information about element values. Each of these types of entries is described in greater detail hereafter.

Element Location Entries

In the index 224 illustrated in FIG. 4, entries 430–434 are element location entries 420 because those entries correspond to an element; entries 436, 440, and 442 are element attribute entries 422 because those entries correspond to an attribute of an element having a corresponding entry in the element location entries 420; and entries 435, 438 and 444 are element value entries 424 because those entries correspond to text circumscribed by an element having a corresponding entry in the element location entries 420.

In an embodiment, each entry may include several pieces of information, such as, e.g., an entry name, an entry type, and location information. An entry name may be used as a reference to quickly identify the particular entry. In other words, entries are referenced by their name. An entry type identifies what the type of an entry is, and is determined by whether the entry is an element location entry, an element attribute entry, or the element value entry.

For example, in the example illustrated in FIG. 4, the element location entries 420 have an entry type of 7, while the element attribute entries 422 and the element value entries 424 have an entry type of 10. Location information refers to information that identifies the location of where the subject matter of the entry may be found. As the subject matter may appear in more than one place, a unit of location information exists for each occurrence of the subject matter of the entry. As used herein, a "unit" of location information refers to a single reference to the subject matter of an entry.

Entries in the element location entries 420 are constructed by recording the name of the element associated with the entry as the entry name. For example, entry 430 is associated with the element <A attr1='aattval'> and therefore has an entry name of A.

For each entry in the element location entries 420, in addition to recording the entry name, location information is also recorded that identifies the location of the element to which that entry corresponds. In an embodiment, an element location entry records a document identification number, an offset value, a length value, and a depth value of the element to which that entry corresponds. A document identification number is a unique identifier for each XML document stored by persistent storage 220.

An offset value is a value associated with each element that is determined by counting the number of start-tags or empty-elements tags in the document that the element resides. For example, the first element in a document has an offset value of one, the second element in a document has an offset value of two, the twentieth element in a document has an offset value of twenty, and so on.

A length value is a value associated with each element that describes how many other elements that element circumscribes. A depth value is a value associated with each element that describes how embedded that element is within other elements. For example, the depth value may be obtained by traversing the document, wherein a counter is incremented one point for each start-tag and decremented one point for each end-tag, until arriving at the desired element.

For example, entry 430 has an entry type of "7," which is arbitrarily assigned to the element location entries 420. As the entry type of entry 430 is 7, the location information is structured in the format: (document identification number: offset value:length value:depth value). Entry 430 has only one unit of location information, because there is only one occurrence of an element of type A in the elements 410. Entry 430 has a documentation identification number of "1" because the XML document that elements 410 reside in has been assigned a document identification number of "1." Entry 430 has an offset value of 1 because element 412 is the first element in document 1. Entry 430 has a length value of "3" because three elements are circumscribed within element 412. Entry 430 has a depth value of "1" because element 412 is not circumscribed by any other elements.

Element Attribute Entries

For each of element attribute entries 422, information is recorded to describe the attribute of an element having a corresponding entry in the element location entries 420. Entry names in the element attribute entries 422 are composed by concatenating the value of the attribute name and the value of the attribute value. In the example illustrated in FIG. 4, entries in the element attribute entries 422 are arbitrarily assigned an element type of "10," signifying that the location information of that entry is structured in the format: '(document identification number: parent offset).'

In an embodiment, each entry in the element attribute entries 422 records a document identification number and an offset value for the element in the element location entries 420 having the attribute that the entry describes ("the parent offset"). For example, entry 440 has an entry name of '{battr} {battrval}', which is the value of the attribute name and the value of the attribute value. There are two units of location information, because there are two elements of type B with the same attribute name and value in elements 410. Each unit of location information in entry 440 has a document identification number of "1" because the XML document that elements 410 reside in has been assigned a document identification number of "1." The first unit of location information in entry 440 has a parent offset value of "2" because the attribute described by entry 440 is associated with attribute 414, and the offset value of attribute 414, indexed in entry 432 in the first unit of location information, is "2." The second unit of location information in entry 440 has a parent offset value of "4" because the attribute described by entry 440 is associated with attribute 418, and the offset value of attribute 418, indexed in entry 432 in the second unit of location information, is "4."

Element Value Entries

For each entry in the element value entries 424, information is recorded to describe text circumscribed by an element having a corresponding entry in the element location entries 420. Entries in the element value entries 424 are composed by concatenating the name of the element type circumscribing the text and the text that is being circumscribed by the element. In some cases, the text that is being circumscribed may span a single element, e.g., entry 444, or the text may span multiple elements, e.g., entry 435. In other words, entry 435 is composed by concatenating the element name of 'A' with the text of Bval and Cval, which the element circumscribes. In the example illustrated in FIG. 4, entries in the element value entries 424 are arbitrarily assigned an element type of "10," signifying that the location information of that entry is structured in the format: '(document identification number: parent offset).'

In an embodiment, each entry in the element value entries 424 records a document identification number and an offset value for the element in the element location entries 420 that circumscribes the text associated with the entry ("the parent offset"). For example, entry 438 has an entry name of '{B}{Bval}', which is the name of the element type circumscribing the text and the text that is being circumscribed by the element. Entry 438 has only one unit of location information because there is only one element of type B with the value of 'Bval.' Entry 438 has a document identification number of "1" because the XML document that elements 410 reside in has been assigned a document identification number of "1." Entry 438 has a parent offset value of "2" because the offset value of attribute 414, indexed in entry 432, is "2."

Locating XML Elements Using the Index

Using information associated with each entry, index 224 may be used to determine the location of each element, attribute of an element, or text circumscribed by an element. For example, entry 436 is associated with a value of 1 for the document identification number, and a value of 1 for the parent offset. Thus, for that entry, index 224 points to the entry associated with element 412, namely entry 430, because that entry is the first element in the first document. As index 224 stores information about the location of element 412 in entry 430, e.g., a document identification number, an offset value, a length value, and a depth value, index 224 is able to accurately identify the specific location of element 412.

Entries in index 224 may be hashed for purposes of increasing performance as is well understood to those in the art. In an embodiment, entries of index 224 are hashed into a sixteen byte hexadecimal number. As entries in the element attribute entries 422 are constructed by concatenating the attribute name and the attribute value, the attribute name and the attribute value may each be hashed into an eight byte hexadecimal number, resulting in a sixteen byte hexadecimal number once they are concatenated. In like fashion, as entries in the element value entries 424 are constructed by concatenating the name of the element type circumscribing the text and the text that is being circumscribed by the element, the name of the element type circumscribing the text and the text that is being circumscribed by the element may each be hashed into an eight byte hexadecimal number, resulting in a sixteen byte hexadecimal number once they are concatenated.

Processing Queries Using the Index

Client 230 issues a query for a set of XML documents that correspond to a set of specified search criteria. In an embodiment, the set of specified search criteria may be expressed using the XPATH standard. For example, the set of specified search criteria may be of the form:

/A/B which represents an element of type A that has an element of type B circumscribed exactly one level beneath it. In another example, the set of specified search criteria may be of the form:

/A//B[C]

which represents an element of type A that has an element of type B circumscribed at any level beneath it, regardless of how many levels deep the element of type B is, wherein the element of type B has an element of type C. In other words, using the XPATH standard, one may formulate of set of search criteria based upon both the relationship between elements and the attributes of the elements. Those skilled in the art of XPATH queries understand that the XPATH standard may be used to formulate numerous other sets of search criteria. Additionally, sets of search criteria may be expressed in other formats and styles other than the XPATH standard; consequently, embodiments of the invention are not limited to expressing the set of search criteria used by a query to those expressed in the XPATH standard, as the use of the XPATH standard herein is merely for the ease of explanation.

Figure 5:
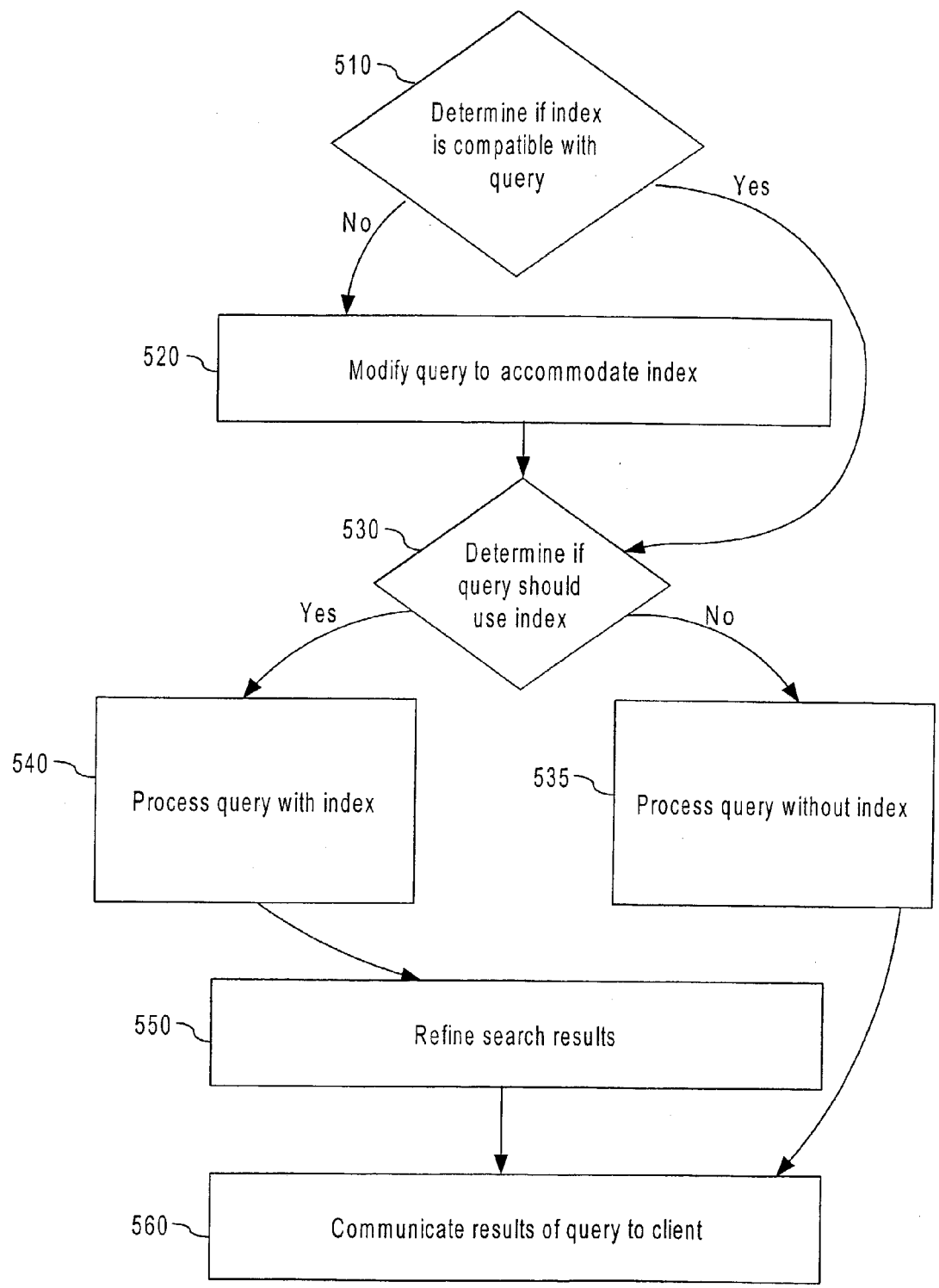
FIG. 5 is a flowchart of the high-level function steps of processing queries using an index according to an embodiment of the invention.

Upon receiving a query for XML documents from client 230, database server 210 processes the query. FIG. 5 is a flowchart of the high-level function steps of processing queries using an index according to an embodiment of the invention.

In an embodiment, the process steps of FIG. 5 are performed by database server 210. However, it is contemplated that in other embodiments, one or more of the functional steps described in FIG. 5 may be performed by other processing entities.

In step 510, a determination is made as to whether index 224 is compatible with the query. In an embodiment, the query may contain one or more characters in the set of search criteria that index 224 cannot process. A check is made to identify if the set of specified search criteria contained within the query contains any characters or expressions that index 224 cannot process. For example, in an embodiment, index 224 cannot accommodate (a) XPATH functions, (b) numerical range operators, (c) numerical equality statements, (d) arithmetic operators, (e) the union operator, (f) the existence of a attribute, (g) a positional index predicate, e.g., /A/B[5], (h) a parent axis, aka ".." (i) an attribute following a "*" or "//", e.g., "/A/*/@attr", "/A//@attr", and "/A//../@attr", (j) a "." or "*" at the end of the path expression, (k) a predicate following "." or "*", (1)

string literal equality expressions where the left hand side is not a path or the right hand side is not a literal.

If the determination of step 510 is positive, then processing proceeds to step 530. If the determination of step 510 is negative, then processing proceeds to step 520.

In step 520, the query is modified to accommodate index 224. The portion of the query that is incompatible with index 224 is modified such that the incompatible portion of the query is removed; thereby leaving only a portion of the query that is compatible with index 224. The modified query can then be run against index 224 to produce a superset of rows that are guaranteed to contain the XML documents that satisfy the unmodified query.

For example, a query with a set of search criteria of:
/A/B[C 10]

would be modified to:
/A/B

In another example, a query with a set of search criteria of:
/A/B[C=10]

would be modified to:
/A/B

In another example, a query with a set of search criteria of:
/A/B[contain (c, "oracle")]

would be modified to:
/A/B

In another example, a query with a set of search criteria of:
/A/B[foo( )]

would be modified to:
/A/B

After the query is modified to accommodate index 224, processing proceeds to step 530.

In step 530, a cost based optimizer determines if it is more efficient to use index 224 in responding to the query than without using index 224. In other words, index 224 will only be used to process the query if the cost based optimizer determines that it will be faster to do so. For example, if the set of specified search criteria matched 95% of the XML documents stored within the persistent storage 220, then a cost based optimizer may determine that it would take more time to process the query with index 224 than without index 224, given the associated overhead in using index 224.

If the determination of step 530 is positive (it is more efficient to use index to process the query), then processing proceeds to step 540. If the determination of step 530 is negative (it is not more efficient to use index to process the query), processing proceeds to step 335. In step 335, database server 210 processes the query without using index 224.

Figure 6:
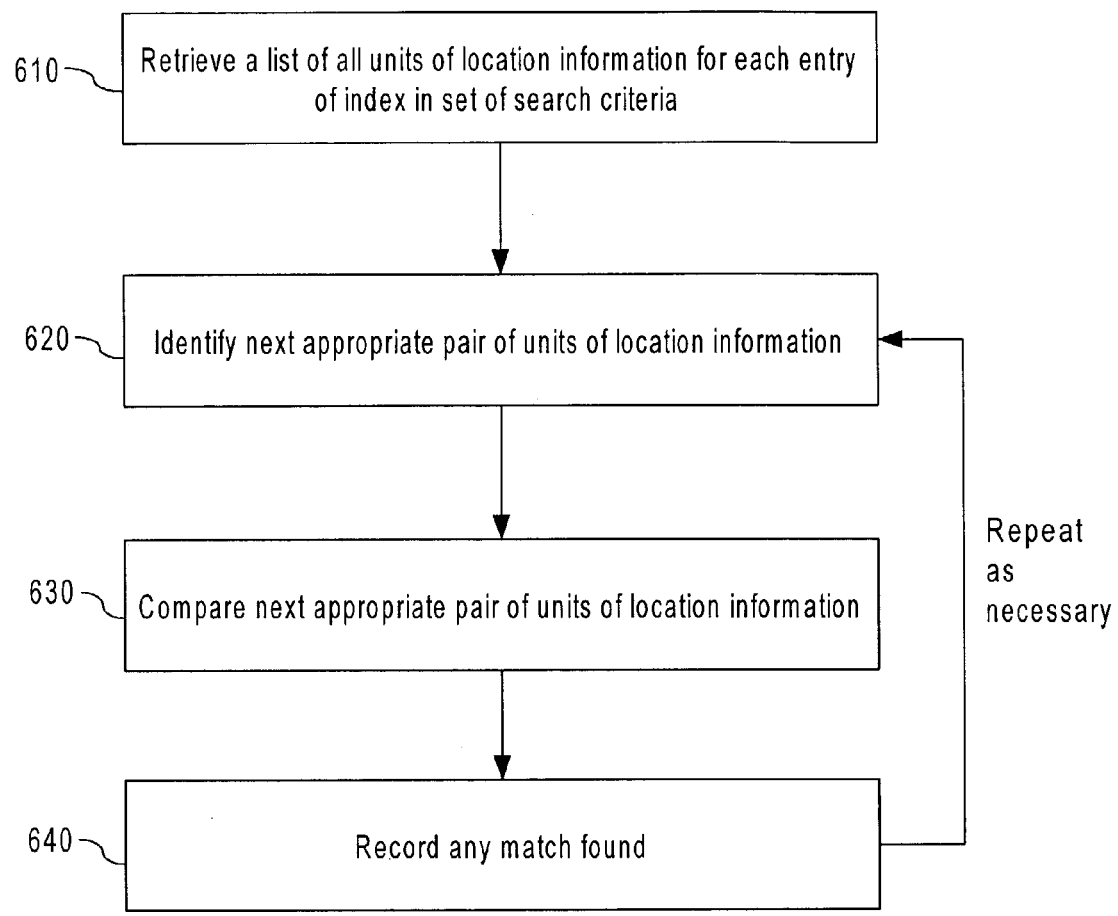
FIG. 6 is a flowchart of the functional steps in generating a list of XML documents that satisfy the set of specified search criteria using an index according to an embodiment of the invention.

In step 540, index 224 is used to generate a list of XML documents that satisfy the set of search criteria specified in the query. Step 540 will be discussed with reference to FIG. 6, which is a flowchart of the functional steps in generating a list of XML documents that satisfy the set of specified search criteria using an index according to an embodiment of the invention.

Initially, in step 610, a list of all units of location information is retrieved for each entry in index 224 which are present in the set of search criteria. For example, if a query contained a set of search criteria consisting of '/A/B' was received by persistent storage with the index displayed in FIG. 4, then "(1:1:3:1)" would be retrieved for entry 430, as entry 430 corresponds to element A, and "(1:2:1:2) (1:4:0: 2)" would be retrieved for entry 432, as entry 432 corresponds to element B. The purpose of retrieving the lists of units of location information is to facilitate comparison of the entries to check if a match of the set of search criteria is present. After performing step 610, processing proceeds to step 620.

In step 620, the next appropriate pair of unit of location information is identified. Initially, the next appropriate pair of unit of location information is the unit of location information that is the top of each list of unit of location information for each entry in index 224 that is present in the set of search criteria. Thereafter, processing proceeds to step 630.

In step 630, the pairs of units of location information are compared to determine if a match is present. The document identification numbers, the offset values, depth values, and length values of the unit of location information are compared to determine if the units of location information match with the search criteria. A match is present if the units of location information indicate that their corresponding entries match the set of search criteria. After the units of location information are compared to the set of search criteria, then processing proceeds to step 640.

In step 640, if a match if identified in step 630, then in an embodiment the document is recorded into a set of XML documents that match the query. In that embodiment, then processing proceeds to step 620, wherein another pair of units of location information are selected. In this embodiment, XML documents that correspond to the set of search criteria are identified, but information about the specific occurrences within those XML documents where elements in the set of search criteria are located in not recorded. In other words, in this embodiment, only the XML documents that match the set of search criteria are recorded.

In another embodiment, information is recorded about the location of all occurrences of elements in the set of XML documents that match the set of search criteria. The units of location information provide this information. Consequently, in this embodiment, processing proceeds to step 620, but any remaining units of information within the document of the last match are chosen to ensure the rest of the XML document is checked for any potential matches. In other words, in this embodiment, the XML documents that match the set of search criteria are recorded, along with any units of location information in which a match was found in step 630. The units of location information, when provided to client 230 in conjunction with the set of XML documents that correspond to the set of search criteria, would allow client 230 to highlight or quickly identify the elements that match the query.

In step 620, when a new pair of location information is identified, the new pair may be identified based upon the last pair of location information to optimize performance. For example, if the last pair of units of location information did not indicate a match, then units of location information that correspond to portions of XML documents already searched need not be considered. When there are no more pairs of location information to be selected, then processing proceed to step 550.

In step 550, the set of XML documents that correspond to the set of search criteria is further refined. In an embodiment, the set of XML documents, returned by index 224, which correspond to the set of search criteria are checked by database server 210 to determine if they match the search criteria. As two different entry names could be hashed to the same value, it may be necessary for database server 210 to check the set of XML documents returned by index 224 in step 550 to ensure that there were no hash collisions if hashing is used. Additionally, if the query was modified in step 520 to produce a superset of XML documents that correspond to the set of search criteria, then database server 210 examines each document in the superset to identify those XML documents in the superset that correspond to the set of search criteria. Database server 210 may check the set of XML documents that ensure that they match the set of search criteria using well-known procedures. If any XML documents are not referenced by index 224, then those XML documents are also checked by database server 210 to determine if they satisfy the search criteria specified in the query. Thereafter, processing proceeds to step 560.

In step 560, the results of the query are communicated to client 230. In step 560, the set of XML documents that were retrieved by database server 210 that correspond to the set of search criteria are transmitted back to database server 210. Database server 210 transmits the set of XML documents that correspond to the set of search criteria to client 230 over communications link 240.

Implementing Mechanisms

Figure 7:
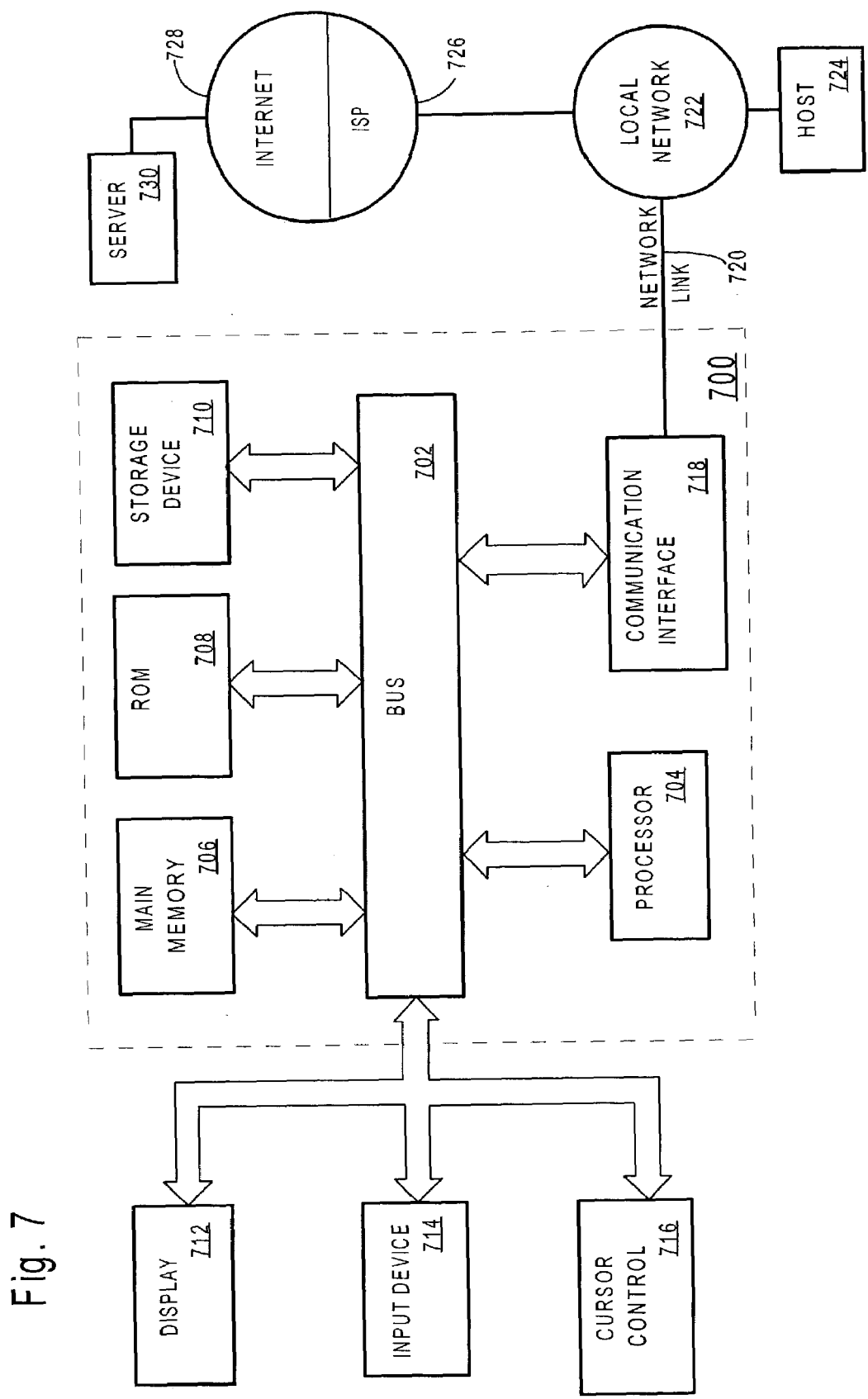
FIG. 7 is a block diagram that illustrates a computer system upon which an embodiment of the invention may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising performing a machine-executed operation involving instructions, wherein the machine-executed operation is at least one of:
   A) sending said instructions over transmission media;
   B) receiving said instructions over transmission media;
   C) storing said instructions onto a machine-readable storage medium; and
   D) executing the instructions;
   wherein said instructions are instructions which, when executed by one or more processors, cause the one or more processors to perform the steps of:
   receiving a query for a set of matching XML documents, wherein the set of matching XML documents are XML documents that satisfy search criteria specified in said query; and
   using an index to identify one or more XML documents that qualify as members of said set of matching XML documents, wherein said index stores
   a first set of entries for element names, wherein the entry for a particular element name includes location information for the particular element name,
   wherein the location information for the particular element name specifies (a) which XML documents, of a plurality of XML documents indexed by said index, contain elements with said particular element name, and (b) where, within each of said XML documents containing said elements with said particular element name, the elements with the particular element name are located;
   a second set of entries for element attributes, wherein the entry for a particular element attribute includes location information for the particular element attribute,
   wherein the location information for the particular element attribute specifies (a) which XML documents, of said plurality of XML documents indexed by said index, contain elements with said particular element attribute, and (b) where, within each of said XML documents containing said elements with said particular element attribute, the elements with the particular element attribute are located; and
   a third set of entries for element values, wherein the entry for a particular element value includes location information for the particular element value,
   wherein the location information for the particular element value specifies (a) which XML documents, of said plurality of XML documents indexed by said index, contain elements with said particular element value, and (b) where, within each of said XML documents containing said elements with said particular element value, the elements with the particular element value are located.

2. The method of claim 1, wherein:
said XML documents are stored within one or more tables in a database,
said one or more tables store said XML documents in a set of indexed rows and a set of non-indexed rows,
said set of indexed rows are indexed by said index, and
said set of non-indexed rows are not indexed by said index.

3. The method of claim 2, further comprising:
determining if any rows in said set of non-indexed rows correspond to said search criteria; and
determining membership of at least a subset of said set of matching XML documents based on those rows in said set of non-indexed rows that correspond to said search criteria.

4. The method of claim 1, wherein said step of using an index comprises:
determining if said query is compatible with said index.

5. The method of claim 4, wherein said step of using an index further comprises:
if said query is not compatible with said index, then modifying said query to produce a modified query for a second set of XML documents, wherein said modified query is compatible with said index; and
wherein said second set of XML documents is a superset of said set of matching XML documents.

6. The method of claim 4, wherein said step of using an index further comprises:
if said query is compatible with said index, then determining if using said index to obtain said set of matching XML documents is faster than not using said index to obtain said set of matching XML documents.

7. The method of claim 6, wherein said step of using an index further comprises:
if using said index to obtain said set of matching XML documents is faster than not using said index to obtain said set of matching XML documents, then determining membership of at least a subset of said set of matching XML documents using said index.

8. The method of claim 1, wherein said first set of entries includes for each element a document identification value, an offset value, a length value, and a depth value.

9. The method of claim 1, wherein said step of using an index comprises:
obtaining XML documents that may qualify as members of said set of matching XML documents using, at least in part, said index; and examining each of said XML documents that may qualify as members of said set of matching XML documents to identify each member in said set of matching XML documents.

10. The method of claim 1, wherein each entry in the first set of entries indicates where, within a hierarchy of elements within each of said XML documents, any element having an element name associated with the entry is located.

11. The method of claim 1, wherein each entry in the second set of entries indicates where, within a hierarchy of elements within each of said XML documents, any element having an attribute name associated with the entry is located.

12. The method of claim 1, wherein each entry in the third set of entries indicates where, within a hierarchy of elements within each of said XML documents, any element having an element value associated with the entry is located.

13. The method of claim 1, wherein the first set of entries, the second set of entries, and the third set of entries are separate from each other.

14. The method of claim 1, wherein the location information for the particular element name specifies a length value and a depth value for each element identified.

15. A method comprising performing a machine-executed operation involving instructions, wherein the machine-executed operation is at least one of:

A) sending said instructions over transmission media;
B) receiving said instructions over transmission media;
C) storing said instructions onto a machine-readable storage medium; and
D) executing the instructions;

wherein said instructions are instructions which, when executed by one or more processors, cause the one or more processors to perform the steps of:

upon receiving a request to store a particular XML document, storing said particular XML document; and updating an index to include a reference to said particular XML document, wherein said reference includes a first set of entries that each identify the location, within the hierarchy of elements of the particular XML document, of element names contained within the particular XML document, a second set of entries that each identify the location, within the hierarchy of elements of the particular XML document, of element attributes contained within the particular XML document, and a third set of entries that each identify the location, within the hierarchy of elements of the particular XML document, of element values contained within the particular XML document, wherein the first set of entries specify (a) which XML documents, of a plurality of XML documents indexed by said index, contain elements with a particular element name, and (b) where, within each of said XML documents containing said elements with said particular element name, the elements with the particular element name are located, wherein the second set of entries specify (a) which XML documents, of said plurality of XLML documents indexed by said index, contain elements with a particular element attribute, and (b) where, within each of said XML documents containing said elements with said particular element attribute, the elements with the particular element attribute are located, and wherein the third set of entries specify (a) which XML documents, of said plurality of XML documents indexed by said index, contain elements with a particular element value, and (b) where, within each of said XML documents containing said elements with said particular element value, the elements with the particular element value are located.

16. The method of claim 15, wherein:

said particular XML document is stored within one or more tables in a database, and said one or more tables store said particular XML document in a set of indexed rows, wherein said indexed rows are indexed by said index.

* * * * *